United States Patent [19]

Verbaan

[11] 4,274,931
[45] Jun. 23, 1981

[54] LEACHING PROCESS FOR ZINC SULPHIDE CONTAINING MATERIALS

[75] Inventor: Bernard Verbaan, Randburg, South Africa

[73] Assignee: National Institute for Metallurgy, Randburg, South Africa

[21] Appl. No.: 113,284

[22] Filed: Jan. 18, 1980

[30] Foreign Application Priority Data

Jan. 24, 1979 [ZA] South Africa ............... 70/0294

[51] Int. Cl.³ .................................... C25C 1/14
[52] U.S. Cl. ..................... 204/119; 423/104; 423/109; 75/104; 75/120
[58] Field of Search ........... 423/109; 75/104, 120; 204/119

[56] References Cited

U.S. PATENT DOCUMENTS

| | | | |
|---|---|---|---|
| 2,927,017 | 3/1960 | Marvin | 75/120 |
| 2,996,440 | 8/1961 | Forward | 204/119 |
| 3,316,059 | 4/1967 | Vizsolyi | 75/120 |
| 3,477,927 | 11/1969 | Veltman | 204/119 |
| 4,004,991 | 1/1977 | Veltman | 204/119 |
| 4,071,421 | 1/1978 | Masters | 204/119 |

FOREIGN PATENT DOCUMENTS 1000121 8/1965 United Kingdom ............ 423/109

Primary Examiner—Brian E. Hearn
Attorney, Agent, or Firm—Cushman, Darby & Cushman

[57] ABSTRACT

A process for treating zinc sulphide materials wherein the sub-divided material is firstly leached, at less than 119° C., with a sulphate leach solution, low in sulphuric acid and having a high iron content together with zinc and impurities in a manner causing iron to precipitate and subsequently leaching the residue and re-dissolving the iron precipitate with spent electrolyte containing regenerated sulphuric acid resulting from the treatment of the leach liquor obtained from the first leach step and wherein the leach solution from the subsequent leach step constitutes the starting leach solution for the first leach step.

13 Claims, 3 Drawing Figures

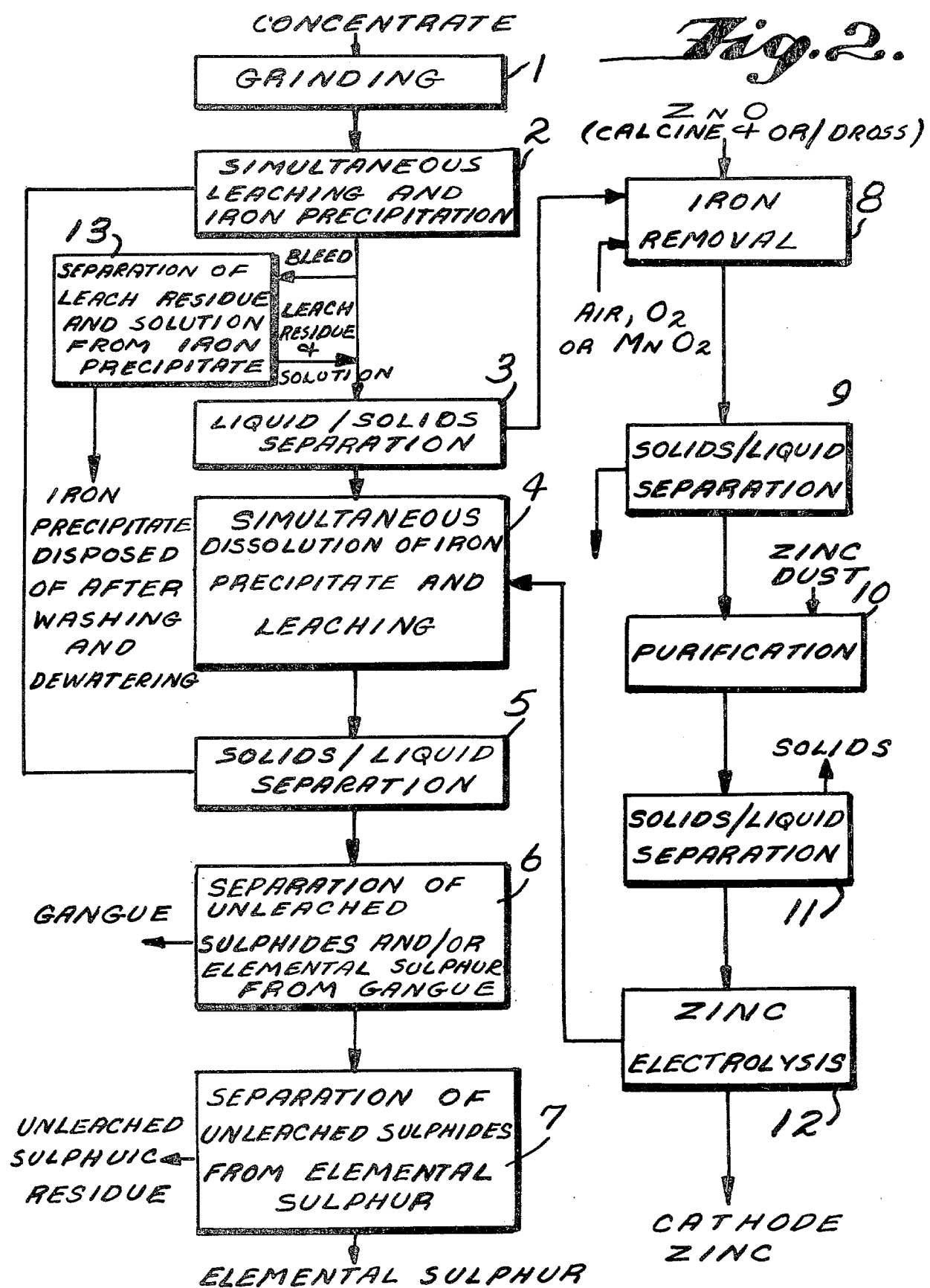

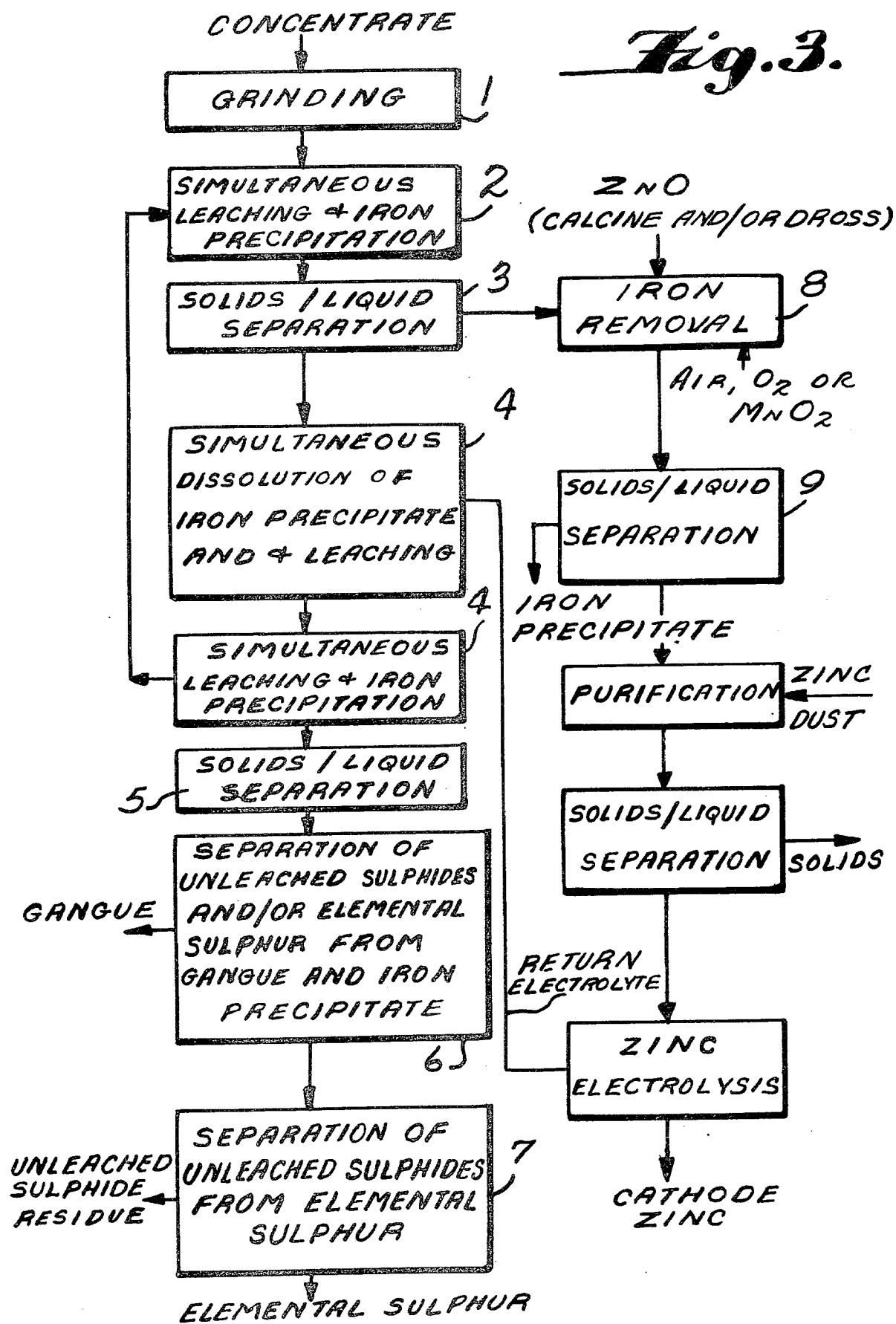

LEACHING PROCESS FOR ZINC SULPHIDE CONTAINING MATERIALS

BACKGROUND OF THE INVENTION

The present invention relates to a process for leaching zinc containing materials which are usually, but not necessarily, minerals in order to recover metal values contained therein with the object of providing a hydrometallurgical process for treatment of such sulphide containing materials.

The processing of metal sulphide containing minerals or ores is attractive from a number of points of view. Firstly, the sulphide minerals can be concentrated by conventional beneficiation techniques, such as, for example, suitable flotation techniques. Secondly, there is, as a result of the hydrometallurgical nature of a leaching process carried out directly on the sulphide containing minerals, no air pollution problem which generally necessitates the construction of a costly sulphuric acid plant for converting the sulphur dioxide formed into sulphuric acid, and thus by using such a hydrometallurgical technique capital expenditures can be reduced. Thirdly, when a sulphide mineral is roasted, in accordance with existing practice, the metals therein are converted to oxides which, after leaching of the majority of the metals contained in such oxide roast product, cannot be easily treated for recovery of the remaining oxides which are unleached. Thus, the residual unleached metal oxides are often discarded as a waste product together with the leach residue.

Zinc sulphide containing minerals have, in the past, been treated by various leaching processes. One of these which involves the direct leaching of a finely ground mineral or ore by sulphuric acid is described in U.S. Pat. No. 2,996,440 to Forward et al. In that process, as is usual, the sulphuric acid is the spent electrolyte from the subsequent electrowinning step. This single stage leaching process proved to be uneconomically slow at the low pressures and temperatures. Since elemental sulphur is liberated in this process the temperature should be maintained below the melting point of sulphur viz. about 119° C. and thus the kinetics cannot be improved by simply raising the temperature.

Subsequent work on this single stage leaching process led to an improvement which is described in British Pat. No. 1,000,121 wherein iron was added to the leach slurry in amounts of about 5 to 15% by weight of the non-ferrous metals being leached. This improved the kinetics of the process which, as will be clear from the above, involved the direct leaching of the mineral or ore with the spent electrolyte. However, the kinetics were, applicant believes, still not satisfactory as a result of which high pressure, high temperature leaching processes were investigated.

These investigations led to various processes being developed and patented in which such mineral sulphides in finely divided form, are pressure leached in an aqueous sulphuric acid solution under oxidizing conditions. Such leaching is generally effected at temperatures above about 135° C. but below about 175° C. A two-stage pressure leaching process of this nature forms the subject matter of U.S. Pat. Nos. 4,004,991 and 4,071,421. In the patented process the sulphur present in the sulphide material again converts to its elemental form and a zinc sulphate bearing leach solution is produced which, after purification, is subjected to electrolysis to recover cathode zinc and to re-generate the aqueous sulphuric acid which is recycled to the leach step. However, leaching at such elevated temperatures results in significant disadvantages including the following:

(i) The process utilises air, or preferably oxygen, to create the oxidising conditions and the partial pressure of the oxygen present must be sufficient to provide a reasonably satisfactory rate of reaction. Since the vapour pressure of water at 135° C. is about 300 kPa and increases up to about 900 kPa at 175° C. high pressures must be utilised in order to provide a satisfactory oxygen partial pressure. This, of course, necessitates the construction of equipment capable of withstanding such high pressures at the elevated temperatures which promote vigorous chemical reactions.

(ii) The use of air to provide the oxygen necessitates that a large gas bleed from the system be provided in order to remove the inert nitrogen and other gases. As a result there will be a high loss of water, and therefore heat associated with such water. Also, there is required capital expenditure to provide suitable condensation equipment to recover the evaporated water.

(iii) Leaching with aqueous sulphuric acid (having an initial acid concentration typically of about 180.0 g/l) at such elevated temperatures, requires that special, and therefore costly, materials of construction must be used for the pressure leaching apparatus.

(iv) Safety hazards associated with the operation of a process under elevated temperature and pressure as indicated above are greater than for a process operating under milder conditions.

(v) As the leaching temperatures under consideration fall above the melting point of elemental sulphur, surface active reagents need to be added to prevent molten sulphur from blinding the mineral surface and thereby inhibiting the leaching. The use of such reagents can add significantly to the cost of the process.

It is accordingly the object of this invention to provide a process for the treatment of zinc sulphide containing materials which involves leaching under less vigorous conditions than are present in the aforementioned high temperature, high pressure process, but nevertheless has acceptable kinetics for industrial application.

It is therefore an object of this invention to enable less costly equipment to be utilised for conducting a leaching process on zinc sulphide containing materials.

SUMMARY OF THE INVENTION

In accordance with this invention there is provided a process for the treatment of zinc sulphide containing materials comprising the steps of:

(i) contacting at a temperature of from 70° C. to 119° C., a sub-divided zinc sulphide containing material with an aqueous leach solution which has dissolved therein zinc and impurities from 5 to 50 g/l iron, together with a maximum of 20 g/l sulphuric acid to dissolve zinc and other soluble metals in the zinc sulphide containing material and cause precipitation of iron.

(ii) separating the solids and leach liquor resulting from step (i);

(iii) subjecting the leach liquor obtained in step (ii) to any required purification steps followed by electrowinning of zinc therefrom to leave a spent electrolyte having regenerated sulphuric acid therein;

(iv) contacting spent electrolyte resulting from step (iii) above with the solids resulting from step (ii) above to cause redissolution of iron precipitate and the further dissolution of zinc and metal impurities from the residue of the zinc sulphide containing material;

(v) separating the solids and leach solution resulting from step (iv) and, (vi) utilising the leach solution resulting from step (v) as at least the major portion of the aqueous leach solution employed in step (i).

BRIEF DESCRIPTION OF THE DRAWINGS

FIG. 2 is a schematic flow diagram of a second embodiment of the present invention; and FIG. 3 is a schematic flow diagram illustrating a third embodiment of the present invention.

Figure 1:
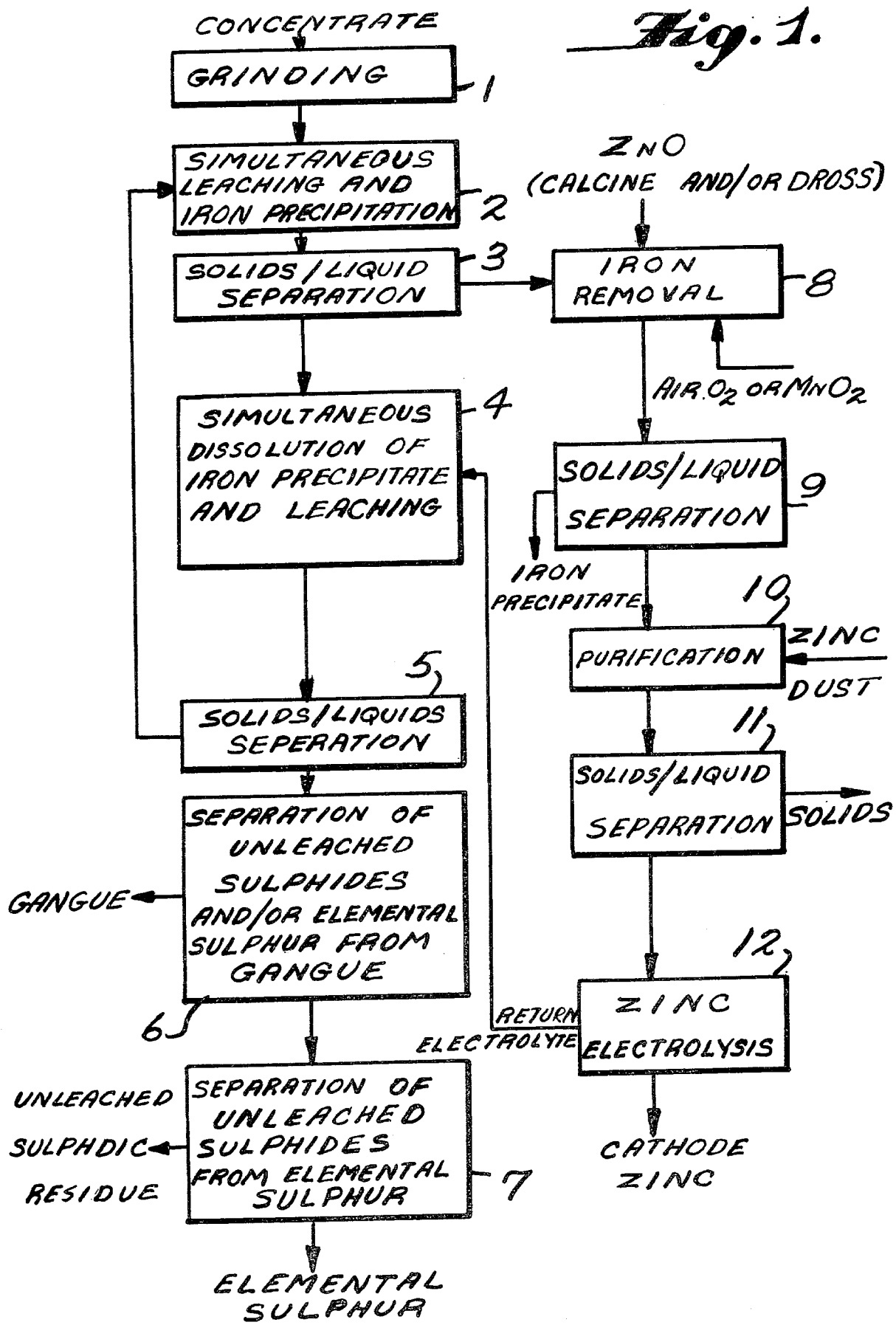
FIG. 1 is a schematic flow diagram of a first embodiment of the present invention.

Further features of the invention provide for conditions in step (i) to be controlled such that the iron is precipitated predominantly in the form of goethite which is easily acid soluble in step (iv), for iron to be removed at a rate at which it is introduced into the system by way of the zinc containing material; and for the zinc containing material to be a finely ground zinc sulphide containing mineral or ore such as sphalerite, for example.

When applied to zinc recovery by electrowinning according to current industrial practice the spent electrolyte generated in step (iii) will have a zinc content of from 40 to 60 g/l, preferably about 50 g/l and a sulphuric acid content of about 120 to 180 g/l, preferably about 150 g/l.

In such circumstances the leach solution resulting from step (v) above will preferably contain 5 to 50 g/l iron which is preferably, at least for the most part, in the ferrous state; 90 to 130 g/l zinc and from about 5 to 15 g/l sulphuric acid. Preferred values are about 30 g/l iron, 120 g/l zinc and from 5 to 10 g/l sulphuric acid.

Such a leach solution will, in practice, result in a leach liquor resulting from step (ii) having from 1 to 20 g/l iron, less than 10 g/l sulphuric acid, and about 130 to 160 (usually about 150) g/l zinc.

There are many impurities which may be dissolved together with the zinc and these will depend on the starting zinc sulphide material or mineral. In particular, it must be noted that relatively high concentrations of manganese can be experienced, particularly where certain zinc minerals are being treated which have relatively high manganese concentrations. Manganese is usually removed, at least to some extent, subsequent to, or at least during, treatment of the zinc rich leach liquor, and prior to return of the spent electrolyte to the leaching process. However, such spent electrolyte will often contain manganese in amounts of up to 18 to 20 g/l and in some cases up to about 30 g/l.

Clearly the usual mass balances will apply to processes according to the invention and thus sufficient sulphate must be present in the spent electrolyte to achieve the required leaching. Make up sulphate or sulphuric acid may thus be required. Also, iron will probably be present in the starting zinc sulphide containing material and must be be bled off in some suitable manner as will become clear from the following description.

The objects and advantages of the present invention will become more apparent from the following expanded description of the invention.

The various reactions believed to be occurring in the process are first described.

The overall reaction between the oxidising compound and the sulphides may be generally depicted, using sphalerite by way of an example, by the following equation:

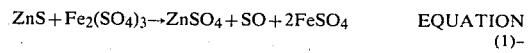

$$ZnS + Fe_2(SO_4)_3 \rightarrow ZnSO_4 + SO + 2FeSO_4 \qquad \text{EQUATION (1)}$$

The dissolved iron which acts an an oxygen carrier is re-oxidised to the ferric state by elemental oxygen as folows:

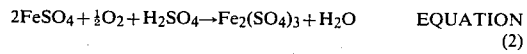

$$2FeSO_4 + \tfrac{1}{2}O_2 + H_2SO_4 \rightarrow Fe_2(SO_4)_3 + H_2O \qquad \text{EQUATION (2)}$$

However, if and when the sulphuric acid concentration drops to a sufficiently low level (say less than between 2.0 g/l and 10.0 g/l) relatively low sulphate acid-soluble, hydrated iron oxide goethite-type precipitate will form effectively as follows:

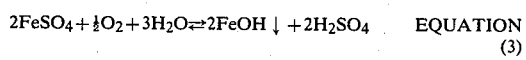

$$2FeSO_4 + \tfrac{1}{2}O_2 + 3H_2O \rightleftharpoons 2FeOH \downarrow + 2H_2SO_4 \qquad \text{EQUATION (3)}$$

(Note: This reaction may not actually take place as such but the equation shows the effective reaction. The actual reaction probably involves ferric ions or species as an intermediate with hydrolysis taking place to form goethite and other types of iron precipitates).

Precipitation, according to Equation (3), is associated with the production of sulphuric acid, and proceeds only until equilibrium is achieved. However, the acid can be consumed according to Equation (2) to form ferric ions, which in turn are reduced by the sphalerite as shown in Equation (1). If conditions are correctly selected, Equations (1), (2) and (3) can be made to proceed simultaneously with the sphalerite effectively acting as a neutralising agent to enable the iron to be precipitated from the solution in the desired manner.

It has been shown that the iron thus precipitated by Equation (3) processes settling and filtration characteristics which are dependant on the $Fe^{3+}$, $H_2SO_4$ and total sulphate concentrations and other conditons prevailing, and that these characteristics can be greatly enhanced by the use of a polyelectrolyte flocculant. It has still further been shown that the iron precipitate will readily redissolve in an aqueous sulphuric acid solution having a concentration similar to that of a typical return electrolyte as follows:

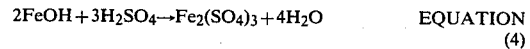

$$2FeOH + 3H_2SO_4 \rightarrow Fe_2(SO_4)_3 + 4H_2O \qquad \text{EQUATION (4)}$$

In the case of leaching a sphalerite concentrate it is the ability to re-dissolve and recycle all or a portion of the precipitated iron which enables Equations (1) and (2) to be performed with high concentrations of dissolved iron present.

It has been further shown that the ferrous ion oxidation reaction described by Equation (2) frequently constitutes the rate limiting step when operating simultaneously with reactions described by Equations (1) and (3). A model describing the differential rate of the reaction described by Equation (2) has been presented in the literature by Matthews and Robins (Australian Institute of Mining and Metallurgy Proceeding No. 242 p 47–58 June 1972) as follows:

$$\frac{d(Fe^{3+})}{dt} = -\frac{d(Fe^{2+})}{dt} = -4.0 \times \frac{d(O_2)}{dt} = \quad \text{EQUATION (5)}$$

$$5.28 \times 10^{11} \exp\left(\frac{-17600.0}{RT}\right) \frac{(Fe^{2+})^{1.84}(O_2)^{1.01}}{(H^+)^{0.25}}$$

where ( ) represents the molar concentration of the indicated species.

It is thus observed that the rate of the reaction described by Equation (2) increases with increasing temperature, ($Fe^{2+}$) and ($O_2$), but decreases with increasing ($H^+$). Thus a desired rate can be achieved by selecting values for the temperature, ($Fe^{2+}$), ($O_2$) and ($H^+$) all of which must be within certain limits which are dictated by economic or practical considerations.

Embodiments of the present invention will now be described by way of an example with reference to the accompanying drawings (FIGS. 1, 2 and 3) which are flow diagrams of proposed composite processes which each embody the process of the invention.

The three embodiments are similar except for the manner and point at which iron (in the form of a predominently goethite precipitate) is bled from the circuit in order to remove an amount of iron equivalent to that dissolved from the incoming zinc sulphide material and thus maintain a balance of the dissolved iron throughout the circuit as described in each embodiment.

The embodiment 1 represented in FIG. 1 will now be described in some detail, and the variations in the iron removal procedure of embodiments 2 and 3 represented by FIGS. 2 and 3 will be described briefly.

The concentrate entering the process may or may not require additional grinding indicated in the drawings as step 1. Generally, however, the concentrate should be comminuted to provide an optimum surface area and size distribution to maximise the liquid/solid reaction between the sulphide and the leach solution.

The ground concentrate is fed to the first leaching step 2 where it is repulped with recycle leach solution from the second leaching step 4 and its following separation step 5. The pulp density will depend on considerations such as the grade of the concentrate; on whether unleached zinc sulphide concentrate is to be recycled, and on the desired metal values in the final solution. The leaching apparatus used should ensure adequate liquid/solid and gas/liquid contacting.

The temperature in the first leaching step 2 should be above 70.0° C. and preferably, below the atmospheric boiling point of the solution. A temperature nearly as high as the melting point of sulphur is about 119° C. may be utilised but a temperature of about 90° C. is generally preferred. The oxygen partial pressure in this step could vary between that obtained when air is used under atmospheric conditions and an upper limit of several hundred kilopascals depending on the rates of reaction which are required.

The sulphuric acid concentration in the recycle leach solution from the second leaching step 4 should be at a value just high enough to prevent hydrolysis and precipitation of iron in the second leaching step 4. The dissolved iron in this leach solution may be at any concentration above 5.0 g/l and below say 50.0 g/l and is preferable about 30 g/l. The actual concentration chosen will depend on the leach reaction rates which are desired for a given set of temperatures, oxygen partial pressure and other conditions. Most ferric ions in the leach solution from the second leaching step 4 will be rapidly reduced to their ferrous state by the fresh zinc sulphide in the feed concentrate according to the reaction expressed by Equation (1) However, the oxidation reaction expressed by Equation (2) and the iron precipitation reaction expressed by Equation (3) will take place simultaneously with the reaction expressed by Equation (1). The overall effect will be that the iron concentration will decreased, any such decrease being associated with an approximately stoichiometric increase in the zinc concentration.

Iron sulphide contained in the concentrate which leaches into solution will result in the precipitation of a stoichiometrically equal amount of iron resulting in no change in the dissolved concentration. If other metallic sulphides such as manganese or lead leach into solution, then the overall rate of decrease in the molar iron concentration will exceed the rate of increase in the molar zinc concentration.

It has been found that flocculation (for example using a non-ionic polyacrilamide flocculent marketed under the Trade Name "Magnafloc 351" by Allied Colloids S.A. (Pty) Ltd.) of the solids after the first leach step is enhanced by recycling some leach liquor from the stream going to the electrowinning section to dilute the pulp emanating from the first leaching step 2. The flocculated solids are then permitted to settle, whereupon the supernatant liquor is decanted and the flocculated pulp dewatered by a suitable apparatus such as a vacuum belt filter. This process takes place at the liquid/solids separation step 3.

The filtrate from the separation step 3 proceeds to an iron removal step 8 in which the residual iron is removed using any suitable method. For example, air, oxygen or manganese dioxide may be used to oxidise the ferrous ions to their ferric state whilst a neutralising agent such as zinc oxide calcine or dross is added to raise the solution pH and result in hydrolysis of the ferric ions to form a goethite iron precipitate. The pulp from the iron removal step 8 is subjected to a second dewatering step 9 which may be similar in nature to that previously described in relation to the separation step 3. This iron precipitate may be disposed of after ensuring that most of the water soluble zinc values contained therein have been recovered.

The filtrate from the second dewatering step 9 is subjected to conventional purification steps indicated in the drawings as step 10 to remove cationic impurities such as Ni, Cu and Co. Solid products from this step are removed in a separations step 11. The resultant rich electrolyte proceeds to the zinc electrolysis circuit indicated as step 12. The steps numbered 8 to 12 represent well established technology to those skilled in the art and need not be described further.

The solids from the first dewatering step 3 consisting of unleached concentrate, elemental sulphur and iron precipitate are repulped using return electrolyte from zinc electrolysis step 12 to provide a second leaching step 4. The apparatus used in this step should ensure adequate liquid/solid and gas/liquid dispersion. The temperature in the second leaching step 4 may be at any value below the melting point of sulphur and is preferably below the solution boiling point but above a temperature of about 70.0° C. A temperature of 90.0° C. is believed to be suitable. The oxygen partial pressure in this step may be at any value ranging from that produced by air at atmospheric pressure to a value of several hundred kilopascals depending on the reaction rates which are desired to be achieved. An oxygen overpressure of say 500.0 kPa produced using oxygen gas would be suitable.

The goethite type iron precipitate introduced into this step 4 dissolves rapidly in the spent electrolyte resulting in a correspondingly rapid decrease in the sulphuric acid concentration according to the reaction expressed by Equation (4). The ferric ions thus produced react with the zinc and other sulphides in the concentrate present in the solids from the first separations step 3 to produce ferrous ions according to the reaction represented by Equation (1). Such ferrous ions are then re-oxidised to their ferric state by the reaction represented by Equation (2) and in so doing sulphuric acid is consumed. The overall effect is that the reactions expressed by Equation (4) (1) and (2) proceed simultaneously.

In Embodiment 1 the reactions are terminated by reducing the oxygen partial pressure to zero when the acid concentration has been reduced to a level just above the point at which iron precipitation would take place.

The leach pulp from this second leaching step 4 is readily dewatered in a suitable device indicated as step 5 such as a vacuum belt filter. The filtrate from this step 5 proceeds as a solution to the first leaching step 2. The solids are subjected, at a step indicated by numeral 6, to a recovery process for unleached zinc sulphide (provided sufficient is present to justify its recovery) and elemental sulphur from the gangue using a suitable method such as, for example, flotation. In a final step 7 the elemental sulphur may be separated from the unleached zinc sulphide residue using a suitable method such as, for example, hot filtration, distillation or solvent extraction. If an economically important amount of unleached zinc sulphide is recovered from step 7, this may be either recycled or subjected to a roasting step to provide calcine for use in the iron removal step 8.

Embodiment 2, as shown in FIG. 2, differs from Embodiment 1 only in that the iron concentration is reduced to as low a level as is economically possible in the first leaching step 2 so that very little iron needs to be removed in the iron removal step 8. A bleed stream is taken from the pulp leaving the first leaching step 2 into a main iron removal step 13. Here the unleached zinc sulphide residue and elemental sulphur are separated from the leach solution and the iron precipitate by a suitable method (e.g flotation). The iron precipitate is dewatered by a suitable method, washed and disposed of. The leach residue, elemental sulphur and leach liquor from this step 13 are then fed back to the first dewatering step 3.

The amount of iron removed from the circuit in this main iron removal step 13 should be such that the sum of the iron removed in both iron removal steps 13 and 8 result in an iron balance being achieved throughout the two stage leach circuit.

Embodiment 3 represented by FIG. 3 differs from Embodiment 1 again only in that the iron concentration in step 2 is reduced to as low as level as is economically possible. All of the solids from the first leaching step 2 are then fed into the second leaching step 4, and the reactions represented by Equations (1), (2) and (3) are permitted to proceed simultaneously in the second leaching step 4 until the acid level decreases so low that iron precipitation takes place. Sufficient iron is then precipitated out of solution so that the sum of iron precipitated and removed in both iron removal steps 4 and 8 result in an iron balance being maintained throughout the two stage leach circuit.

In this embodiment the unleached zinc sulphide and elemental sulphur are separated from the gangue and iron precipitate as described above.

It will be understood that the above described processes, and in particular, that described with reference to FIG. 1, may be run parallel to an existing treatment plant involving the roasting of the zinc sulphide and in such a case, a plentiful supply of zinc oxide will be available for effecting the iron removal described in relation to step 8.

In order to test the operation of the invention experiments were conducted on sphalerite concentrates which are denoted as Concentrate A, Concentrate B and Concentrate C. The concentrates used were as follows:

Concentrate A analysed Zn—50.9%, Fe—9.1% Mn—2.5%, Pb—0.47%, S(total)—30.8%, Cu—0.14% Cd—0.14%, Ca—0.01%, $SiO_2$—2.19%.

This concentrate was used in the tests as received from a flotation concentrator, without subjecting it to additional grinding.

Concentrate B was produced from Concentrate A by milling samples of dried concentrate A very fine in a Ziebtechnik laboratory vibratory mill.

Concentrate C was a different concentrate and analysed Zn—50.6%, Fe—8.6%, Cu—1.2%, Pb—1.09%, sulphide sulphur—33.0%.

This concentrate was used in an experiment, as received from a flotation concentrator, without subjecting it to additional grinding.

Tables 1 and 2 below summarise the size distributions as determined by screening and cyclosizing and surface areas for concentrates A, B and C as determined, in the latter case, by the Brunauer, Emmet, Teller inert gas adsorption method.

TABLE 1

Size distributions of concentrates A, B, and C.

| | | CONCENTRATE | | |
|---|---|---|---|---|
| | | A | B | C |
| SIZE $\times 10^6$ (m) | | Cumulative % retained | Cumulative % retained | Cumulative % retained |
| Screens | 90,0 | 5,2 | — | 9,68 |
| | 75,0 | 12,2 | 3,17 | 14,96 |
| | 63,0 | 19,3 | 4,56 | 17,72 |
| | 45,0 | 36,7 | 14,35 | 35,02 |
| | 38,0 | 50,0 | 17,96 | 40,76 |
| Cyclosizer | 29,3 | 61,52 | 25,33 | 50,04 |
| | 22,8 | 71,21 | 35,27 | 63,02 |
| | 16,4 | 79,8 | 45,11 | 72,24 |
| | 11,1 | 84,41 | 55,4 | 79,42 |
| | 8,5 | — | 61,52 | 82,92 |

TABLE 2

B.E.T. determined surface areas of Concentrates A, B and C.

| | CONCENTRATE | | |
|---|---|---|---|
| | A | B | C |
| BET surface area (m²/g) | 0,7 | 1,9 | 0,83 |

Experimental Results

Tests were conducted for the following cases in order to demonstrate the fundamental principles underlying the present inventions.

Case (i) Reactions 1, 2 and 3 taking place simultaneously;
Case (ii) Reactions 1 and 2 (but not 3) simultaneously;
Case (iii) Reaction 1 (but not 2 or 3) by itself;
Case (iv) Reaction 2 (but not 1 or 3) by itself;
Case (v) Reaction 4 by itself.

Test results for each of these conditions are set out below.

Case (i) Test Results

Tests were conducted under favourable conditions for the specified reactions to take place simultaneously in a 5.0 l 316 L stainless steel autoclave. A flotation cell type of gas dispenser and agitator was fitted in the autoclave in order to continuously re-disperse the gas as very fine bubbles to prevent gas dispersion being rate limiting. However, the arrangement used did not necessarily result in optimal re-dispersion of the sulphide and elemental sulphur solids which exhibited tendencies to float. It will be noted that in most instances elevated pressures were used but relatively low temperatures.

The experimental conditions and results of test examples numbered herein as 1 to 7 are set out in Table 3 below.

TABLE 3a

Test results for case (i) conditions (i.e. sphalerite leaching under conditions such that reactions given by Equations (1), (2) and (3) occur simultaneously.)

| | EXAMPLE 1 | | EXAMPLE 2 | |
|---|---|---|---|---|
| Concentrate Type | A | | A | |
| Mass of Concentrate g/l | 200,0 | | 200,0 | |
| Temperature (°C.) | 90,0 | | 90,0 | |
| Absolute Pressure (kPa) | 85,0 | | 185,0 | |
| $O_2$ Partial Pressure (kPa) | 16,0 | | 116,0 | |
| Gas Used | Oxygen | | Oxygen | |
| Time | $Fe^{2+}$ | $Fe^{3+}$ | $Fe^{2+}$ | $Fe^{3+}$ |
| (mins) | (g/l) | (g/l) | (g/l) | (g/l) |
| | $H_2SO_4$ | $Zn^{2+}$ | $H_2SO_4$ | $Zn^{2+}$ |
| | (g/l) | (g/l) | (g/l) | (g/l) |
| 0 | 52,1 | tr | 51,6 | tr |
| | 4,0 | 0 | 10,0 | 0 |
| 15 | 47,5 | 0,1 | 44,2 | 0,6 |
| | 3,8 | 6,7 | 4,6 | 12,2 |
| 30 | 45,0 | 0,1 | 37,6 | 1,0 |
| | 4,2 | 7,9 | 5,0 | 18,3 |
| 60 | 42,8 | 0,1 | 28,3 | 1,0 |
| | 5,0 | 11,0 | 5,0 | 27,2 |
| 120 | 39,0 | 0,2 | 20,3 | 0,8 |
| | 5,0 | 15,7 | 4,8 | 37,9 |
| 180 | 36,8 | 0,6 | 16,0 | 0,2 |
| | 5,0 | 19,5 | 4,8 | 45,0 |
| 240 | 34,4 | 0,1 | 12,2 | 0,2 |
| | 5,2 | 22,4 | 5,0 | 49,9 |

TABLE 3b

| | EXAMPLE 3 | | EXAMPLE 4 | |
|---|---|---|---|---|
| Concentrate Type g/l | A | | A | |
| Mass of Concentrate | 200,0 | | 200,0 | |
| Temperature (°C.) | 90,0 | | 90,0 | |
| Absolute Pressure (kPa) | 685,0 | | 285,0 | |
| $O_2$ Partial Pressure (kPa) | 136,0 | | 216,0 | |
| Gas Used | Air | | Oxygen | |
| Time | $Fe^{2+}$ | $Fe^{3+}$ | $Fe^{2+}$ | $Fe^{3+}$ |
| (mins) | (g/l) | (g/l) | (g/l) | (g/l) |
| | $H_2SO_4$ | $Zn^{2+}$ | $H_2SO_4$ | $Zn^{2+}$ |
| | (g/l) | (g/l) | (g/l) | (g/l) |
| 0 | 51,6 | tr | 51,6 | tr |
| | 11,0 | — | 12,0 | 0 |
| 15 | 38,2 | 2,0 | 34,4 | 3,2 |
| | 5,0 | — | 3,0 | 14,4 |
| 30 | 27,6 | 2,8 | 26,0 | 3,0 |
| | 5,6 | — | 5,4 | 24,7 |
| 60 | 23,0 | 4,0 | 18,0 | 0,6 |
| | 6,0 | — | 5,0 | 34,5 |
| 120 | 16,2 | 5,6 | 11,8 | 0,6 |
| | 7,2 | — | 5,4 | 45,1 |
| 180 | 12,4 | 4,0 | 8,0 | 0,6 |
| | 7,8 | — | 4,6 | 50,6 |
| 240 | — | — | 6,0 | 0,4 |
| | 4,4 | | | 54,6 |

TABLE 3c

| | EXAMPLE 5a | | EXAMPLE 5b | |
|---|---|---|---|---|
| Concentrate Type | A | | A | |
| Mass of Concentrate g/l | 200,0 | | 400,0 | |
| Temperature °C. | 90,0 | | 90,0 | |
| Absolute Pressure (kPa) | 585,0 | | 585,0 | |
| $O_2$ Partial Pressure (kPa) | 516,0 | | 516,0 | |
| Gas Used | Oxygen | | Oxygen | |
| Time | $Fe^{2+}$ | $Fe^{3+}$ | $Fe^{2+}$ | $Fe^{3+}$ |
| (mins) | (g/l) | (g/l) | (g/l) | (g/l) |
| | $H_2SO_4$ | $Zn^{2+}$ | $H_2SO_4$ | $Zn^{2+}$ |
| | (g/l) | (g/l) | (g/l) | (g/l) |
| 0 | 50,4 | tr | 49,4 | tr |
| | 10,0 | 0 | 7,8 | 0 |
| 15 | 20,0 | 7,8 | 14,8 | 1,6 |
| | 2,8 | 18,0 | 5,0 | — |
| 30 | 11,0 | 4,0 | 8,6 | 1,0 |
| | 6,0 | 31,5 | 5,9 | — |
| 60 | 8,0 | 1,6 | 4,4 | 0,8 |
| | 6,0 | 40,8 | 4,8 | — |
| 120 | 4,6 | 0,4 | 2,0 | 0,6 |
| | 4,6 | 49,0 | 4,0 | — |
| 180 | 2,6 | 0,4 | 0,8 | 0,4 |
| | 3,4 | 54,6 | 3,0 | — |
| 240 | 1,6 | 0,6 | 0,4 | 0,2 |
| | 3,0 | 57,6 | 2,6 | — |

TABLE 3d

| | EXAMPLE 6 | | EXAMPLE 7 | |
|---|---|---|---|---|
| Concentrate Type | C | | B | |
| Mass of Concentrate g/l | 378,2 | | 200,0 | |
| Temperature (°C.) | 90,0 | | 90,0 | |
| Absolute Pressure (kPa) | 285,0 | | 585,0 | |
| $O_2$ Partial Pressure (kPa) | 216,0 | | 516,0 | |
| Gas Used | Oxygen | | Oxygen | |
| Time | $Fe^{2+}$ | $Fe^{3+}$ | $Fe^{2+}$ | $Fe^{3+}$ |
| (mins) | (g/l) | (g/l) | (g/l) | (g/l) |
| | $H_2SO_4$ | $Zn^{2+}$ | $H_2SO_4$ | $Zn^{2+}$ |
| | (g/l) | (g/l) | (g/l) | (g/l) |
| 0 | 1,0 | 45,0 | 50,0 | tr |
| | 10,0 | — | 11,0 | — |
| 15 | 33,3 | 8,8 | 19,4 | 5,0 |
| | 2,0 | — | 4,6 | — |
| 30 | 26,2 | 6,8 | 13,2 | 3,6 |
| | 4,4 | — | 5,4 | — |
| 60 | 16,8 | 4,0 | 10,0 | 3,0 |
| | 6,6 | — | 5,6 | — |
| 120 | 10,2 | 2,0 | 15,4 | 4,0 |
| | 6,0 | — | 7,6 | — |
| 180 | 6,0 | 1,4 | 3,0 | 3,0 |
| | 5,0 | — | 9,0 | — |
| 240 | 4,0 | 1,4 | 3,4 | 3,0 |
| | 4,6 | — | 9,0 | — |

It must be noted that the four different concentrations given at each time and for each test are given in the same spatial positions and their headings indicate the relevant species.

The following points should be noted:

The dissolved iron was initially in the ferrous state in each example except "example 6". In "example 6" the ferric ion concentration was reduced to less than 4.0 g/l within about 60 minutes after adding the concentrate "C".

The oxygen partial pressure in "example 1" was sufficiently low so as to ensure that the rates of reactions (1) and (3) were relatively fast compared to the rate of reaction (3). As the oxygen partial pressure was increased incrementally ("examples 2, 4 and 5") so the rate of reaction (2) increased accordingly with the consequence that higher ferric ion concentrations were observed.

The use of air ("example 3") instead of oxygen ("example 2") resulted in a greater gas flow through the solution and a correspondingly greater extent of flotation of the solids. This had the effect of slowing reaction (1) down relative to reaction (2) and the ferric ion concentrations are observed to be greater for "example 3" than for "example 2". Similarly, concentrate B (which was a finely milled form of concentrate A) demonstrated a greater tendency to float than concentrate A and resulted in a higher ferric ion concentration (compare "examples 7 and 5a").

For the example 5b experiment, the reactor used for the example 5a experiment was modified to create greater mixing turbulence. All other conditions (except the mass of concentrate added) were similar for these two experiments. It is observed that the presence of more concentrate and greater mixing turbulence resulted in significantly increasing the rates of reactions 1, 2 and 3. This is evidenced by the faster rate of decrease in the total iron concentration ($Fe^{2+}+Fe^{3+}$), and the consistently lower residual $Fe^{3+}$ concentration which was maintained.

The above examples serve to demonstrate the main principle of this invention. It is apparent that the apparatus used could be modified and the conditions could be optimised so as to minimise the ferric ion concentration. This would result in the production of iron precipitates with improved settling and filtration characteristics.

The iron precipitate contained in a slurry of the final leach residue (from "example 4") was separated from the non-iron precipitate solids as follows:

(a) All sulphides and elemental sulphur were floated off.

(b) The residual non-iron precipitate was allowed to settle and the iron precipitate slurry was decanted.

(c) The supernatant solution was decanted after allowing the iron precipitate to settle.

(d) The thickened iron precipitate was diluted with fresh dionised water and again allowed to settle.

(e) Steps (c) and (d) were repeated three times.

(f) The final thickened slurry was filtered.

(g) The iron precipitate filter cake was dried and then ground fine.

X-ray diffraction analysis of the dried iron precipitate powder confirmed that it consisted predominantly of geothite (FeOOH), with some hematite ($Fe_2O_3$) being present. The precipitate analysed Fe 46.0%; $SO_4^{--}$ 12.3%; Zn 4.8%; Mn 0.28%; Pb 0.3% elemental sulphur <0.5%, and total sulphur 4.3%.

Case (ii) Test Results

Example 8 given in Table 4 represents the results of a test in which concentrate "A" was leached under conditions such that only reactions (1) and (2) took place. In this example, the oxygen was replaced by nitrogen after 120.0 minutes to permit reaction (1) only to proceed. Note that the dissolved iron was initially present in its ferric form and that the total dissolved iron ($Fe^{2+}$ and $Fe^{3+}$) increased with time due to leaching of the sulphide iron initially present in the concentrate.

TABLE 4

An example of leaching under case (ii) (i.e. reactions 1 and 2 only taking place).

| | EXAMPLE 8 | | | |
|---|---|---|---|---|
| Concentrate Type (—) | A | | | |
| Mass of concentrate (g/l) | 200,0 | | | |
| Temperature (°C.) | 90,0 | | | |
| Absolute pressure (kPa) | 185,0 | | | |
| $O_2$ Partial pressure (kPa) | 116,0 | | | |
| Gas used (—) | Oxygen | | | |
| Time (mins) | $Fe^{2+}$ (g/l) | $Fe^{3+}$ (g/l) | $H_2SO_4$ (g/l) | $Zn^{2+}$ (g/l) |
| 0 | 0 | 35,0 | 90,0 | 0 |
| 5 | 34,0 | 6,6 | 74,0 | 22,0 |
| 10,0 | 38,0 | 2,0 | 72,4 | 25,6 |
| 15,0 | 38,4 | 1,6 | 68,2 | 27,4 |
| 30,0 | 38,4 | 3,2 | 59,0 | 32,0 |
| 60,0 | 37,2 | 6,6 | 40,4 | 41,2 |
| 120,0 | 31,0 | 14,6 | 10,8 | 54,5 |
| (At time t = 120,0 the oxygen was replaced by a nitrogen purge) | | | | |
| 180,0 | 43,6 | 1,0 | 10,8 | 61,6 |

Case (iii) Test Results

Tests were conducted in which reaction (i) alone took place.

Tables 5(a) to 5(c) reflect the results of Examples 9 to 15.

The tests were performed with one 1 g/l of concentrate A or B. This was done so as not to significantly alter the solution composition during leaching, and hence permit the effects of solution related variables to be established. Results (not reported here) demonstrated that generally speaking the sulphide zinc, manganese and iron contained in concentrates A and B leach in proportion to each other. Hence only the percentage zinc leached is reported here. All the tests were conducted in an inert nitrogen atmosphere. The zinc sulphide in concentrates A and B was about 10.0% oxidised prior to leaching. Agitation conditions were confirmed to be such that mass transfer phenomena were not rate limiting.

From the examples presented in Table 5a it is observed that:

(a) The effect of milling concentrate A was to increase the rate of leaching and the percentage zinc extracted in a given time (compare "examples 9 and 10").

(b) Increasing the sulphuric acid concentration increased the initial leach rate slightly, but subsequent rates were slower (compare "examples 10 and 11").

TABLE 5a

Examples of leaching under case (iii) conditions (i.e. reaction 1 alone took place)

| CONDITIONS | EXAMPLE 9 | EXAMPLE 10 |
|---|---|---|
| Concentrate type (—) | A | B |
| Mass of Concentrate (g/l) | 1,0 | 1,0 |
| Temperature (°C.) | 65,0 | 65,0 |
| $(Fe^{3+})°$ (g/l) | 25,2 | 25,0 |
| $(Fe^{2+})°$ (g/l) | ~0 | ~0 |
| $(H_2SO_4)°$ (g/l) | 10,0 | 10,0 |
| Time (mins) | $Zn^{2+}$ (% leached) | $Zn^{2+}$ (% leached) |
| 0 | 0 | 0 |
| 5,0 | 17,1 | 33,8 |

TABLE 5a-continued

Examples of leaching under case (iii) conditions
(i.e. reaction 1 alone took place)

| CONDITIONS | EXAMPLE 9 | EXAMPLE 10 |
|---|---|---|
| 10,0 | 24,4 | 42,8 |
| 15,0 | 31,5 | 52,7 |
| 30,0 | 47,0 | 70,3 |
| 60,0 | 66,0 | 80,4 |
| 120,0 | 85,1 | 92,3 |
| 180,0 | 91,0 | 96,5 |
| 240,0 | 93,7 | 97,6 |
| 300,0 | 94,7 | 98,0 |

TABLE 5b

| CONDITIONS | EXAMPLE 11 | EXAMPLE 12 |
|---|---|---|
| Concentrate type (—) | B | A |
| Mass of concentrate (g/l) | 1,0 | 1,0 |
| Temperature (°C.) | 65,0 | 65,0 |
| $(Fe^{3+})°$ (g/l) | 25,2 | 9,6 |
| $(Fe^{2+})°$ (g/l) | ~0 | 2,1 |
| $(H_2SO_4)°$ (g/l) | 50,0 | 9,2 |
| Time (mins) | $Zn^{2+}$ (% leached) | $Zn^{2+}$ (% leached) |
| 0 | 0 | 0 |
| 5,0 | 32,2 15,2 | |
| 10,0 | 47,0 | 20,5 |
| 15,0 | 54,0 | 26,8 |
| 20,0 | — | 31,2 |
| 30,0 | 71,9 | 40,9 |
| 40,0 | — | 47,6 |
| 50,0 | — | 52,6 |
| 60,0 | 81,5 | 58,4 |
| 120,0 | 87,6 | — |
| 180,0 | 88,8 | — |
| 240,0 | 89,8 | — |
| 300,0 | 92,7 | — |

TABLE 5c

| CONDITIONS | EXAMPLE 13 | EXAMPLE 14 | EXAMPLE 15 |
|---|---|---|---|
| Concentrate type (—) | A | A | A |
| Mass of concentrate (g/l) | 1,0 | 1,0 | 1,0 |
| Temperature (°C.) | 65,0 | 65,0 | 85,0 |
| $(Fe^{3+})°$ (g/l) | 26,0 | 52,4 | 25,6 |
| $(Fe^{2+})°$ (g/l) | 1,8 | 2,2 | 2,3 |
| $(H_2SO_4)°$ (g/l) | 9,8 | 11,7 | 10,8 |
| Time (mins) | $Zn^{2+}$ (% leached) | $Zn^{2+}$ (% leached) | $Zn^{2+}$ (% leached) |
| 0 | 0 | 0 | 0 |
| 5,0 | 16,8 | 20,4 | 36,5 |
| 10,0 | 24,3 | 29,5 | 51,7 |
| 15,0 | 31,3 | 38,7 | 55,6 |
| 20,0 | 43,6 | 46,8 | 68,8 |
| 30,0 | 48,9 | 57,4 | 77,4 |
| 40,0 | 63,9 | 73,1 | 83,5 |
| 50,0 | 67,1 | 80,2 | 85,7 |
| 60,0 | 79,1 | 83,7 | 90,8 |

TABLE 5d

Examples of leaching under case (iii)
conditions in which the effect of
elemental sulphur formed during leaching
is demonstrated

| CONDITIONS | EXAMPLE 16 | | | EXAMPLE 17 | | | EXAMPLE 18 | | |
|---|---|---|---|---|---|---|---|---|---|
| Concentrate type (—) | A | | | Residue from Example 16 without sulphur | | | Residue from Example 16 with sulphur present | | |
| Mass (g/l) | 94,0 | | | 23,1 | | | 28,6 | | |
| Initial sulphur in solids (%) | 0 | | | 0 | | | 17,8 | | |
| Temperature (°C.) | 65,0 | | | 65,0 | | | 65,0 | | |
| $(H_2SO_4)°$ (g/l) | 10,0 | | | 10,0 | | | 10,0 | | |
| Time (mins) | $Fe^{3+}$ (g/l) | $Fe^{2+}$ (g/l) | $Zn^{2+}$ % | $Fe^{3+}$ (g/l) | $Fe^{2+}$ (g/l) | $Zn^{2+}$ % | $Fe^{3+}$ (g/l) | $Fe^{2+}$ (g/l) | $Zn^{2+}*$ % |
| 0 | 56,0 | 0 | 0 | 60,0 | 0 | 0 | 60,0 | 0 | 0 |
| 10,0 | 43,0 | 14,6 | 18,2 | 58,0 | 2,2 | — | 60,0 | 2,2 | 8,9 |
| 20,0 | 32,0 | 18,0 | 21,0 | 58,0 | 4,0 | 17,9 | 58,0 | 4,0 | 17,1 |
| 30,0 | 39,0 | 22,0 | 24,9 | 55,0 | 5,4 | — | 57,0 | 6,0 | — |
| 60,0 | 32,0 | 28,4 | 30,9 | 52,0 | 9,6 | 31,3 | 56,0 | 11,0 | — |
| 120,0 | 16,0 | 35,2 | 37,2 | 44,0 | 16,4 | — | 43,0 | 17,8 | — |
| 180,0 | 11,0 | 38,7 | — | 45,0 | 19,0 | 66,4 | 42,0 | 20,6 | 61,9 |
| 270,0 | — | — | — | 36,0 | 21,0 | 74,6 | 40,0 | 22,6 | — |
| 300,0 | — | — | — | — | — | — | 40,0 | 22,8 | 70,9 |
| After final filtration | 10,0 | 42,8 | 39,7 | — | — | — | — | — | — |

*% Zinc reported on basis of zinc existing in the previously leached residue initially present (which was produced in the test reported in example 16).

(c) Increasing the temperature from 65.0° C. to 85.0° C. significantly increased the leaching rates and the percentage zinc extracted in a given time (compare "examples 13 and 15")

(d) For a given ferrous ion concentration, increasing the ferric ion concentration increases the leaching rate (compare "examples 12, 13 and 14").

The effect of the sulphur formed during leaching, on the subsequent leaching rate was determined as follows.

A fairly large mass of sphalerite was leached under case (iii) conditions to above 40.0% zinc extraction ("example 16"-Table 5). The residue was recovered, dried and split in two. One half was washed thoroughly in perchloroethylene solvent to remove all elemental sulphur from the particles, whilst the other half was not altered in any way. The two fractions were then leached under identical conditions, (results reported in "examples 17 and 18"-Table 5d). It is observed that the presence of the sulphur does slow down the leaching somewhat, especially at higher percentage zinc extraction values.

Case (iv) Test Results

Table 6 summarises the results of test "examples 19 to 21" in which ferrous ions in acid sulphate media were oxidised using oxygen according to the reaction expressed by Equation (2), without reactions 1 or 3 taking place. As oxidation proceeds the sulphuric acid concentration decreases and ferric ions which are formed precipitate when the acid concentration falls below a certain value. Unfortunately, the analytical techniques used were unable to accurately measure the ferric ion and sulphuric acid concentrations under such very low acid concentration conditions.

Provided the correct values for the temperature and the concentrations of $Fe^{2+}$, $O_2$, and $H^+$ are substituted into Equation (5), it can be shown to satisfactorily calculate the differential rate of Equation (2). Efficient gas dispersion is required to prevent mass transport phenomena from being rate limiting.

TABLE 6(a)

Example results for tests conducted under case (iv) conditions, (i.e. oxidation of ferrous ions only according to reaction 2 takes place).

|  | EXAMPLE 19 | | | EXAMPLE 20 | | |
|---|---|---|---|---|---|---|
| Temperature (°C.) | 90,0 | | | 90,0 | | |
| Absolute pressure (kPa) | 85,0 | | | 185,0 | | |
| $O_2$ Partial pressure (kPa) | 16,0 | | | 116,0 | | |
| Gas used (−) | Oxygen | | | Oxygen | | |
| Time | $Fe^{2+}$ | $Fe^{3+}$ | $H_2SO_4$ | $Fe^{2+}$ | $Fe^{3+}$ | $H_2SO_4$ |
| (mins) | (g/l) | (g/l) | (g/l) | (g/l) | (g/l) | (g/l) |
| 0 | 57,6 | 0,6 | 14,0 | 53,8 | 1,6 | 12,0 |
| 5,0 | 55,8 | 1,0 | 12,6 | 42,4 | 11,0 | 4,0 |
| 10,0 | 54,6 | 4,8 | 11,6 | 36,4 | 12,4 | N.D |
| 15,0 | 53,0 | 6,6 | 9,6 | 26,2 | 18,0 | N.D. |
| 30,0 | 48,6 | 7,6 | 7,2 | 18,6 | N.D. | N.D. |
| 60,0 | 41,4 | N.D | N.D | 12,6 | N.D | N.D. |
| 120,0 | 33,0 | N.D. | N.D. | N.D. | N.D. | N.D. |

N.D. NOT DETERMINED because analytical technique used was unsuitable under these conditions.

TABLE 6(b)

Example results for tests conducted under case (iv) conditions, (i.e. oxidation of ferrous ions only according to reaction 2 takes place).

|  | EXAMPLE 21 | | |
|---|---|---|---|
| Temperature (°C.) | 90,0 | | |
| Absolute pressure (kPa) | 285,0 | | |
| $O_2$ Partial pressure (kPa) | 216,0 | | |
| Gas used (−) | Oxygen | | |
| Time | $Fe^{2+}$ | $Fe^{3+}$ | $H_2SO_4$ |
| (mins) | (g/l) | (g/l) | (g/l) |
| 0 | 50,8 | 1,2 | 10,0 |
| 5,0 | 33,2 | N.D. | N.D. |
| 10,0 | 25,8 | N.D. | N.D. |
| 15,0 | 18,0 | N.D. | N.D. |
| 30,0 | 12,6 | N.D. | N.D. |
| 60,0 | N.D. | N.D. | N.D. |
| 120,0 | N.D. | N.D. | N.D. |

N.D. NOT DETERMINED because analytical technique used was unsuitable under these conditions.

The results of "examples 19 to 21" demonstrate the very advantageous effect which results from oxidising under elevated oxygen partial pressure conditions.

Note that the rates of decrease in the $Fe^{2+}$ concentrations of "examples 19, 20 and 21" cannot be directly compared with those for "examples 1, 2 and 4" because:

$$\left( -\frac{dFe^{2+}}{dt} \right)_{\text{under case (iv) conditions}} = 2.0 \times \left( -\frac{dFe^{2+}}{dt} \right)_{\text{under case (i) conditions}} \quad (a)$$

because of stoichiometric considerations, and, (b) the $H+$ concentrations of the case (iv) test experiments were considerably lower than those of the case (i) test experiments.

Case (v) Test Results

A series of tests conducted in which Goethite-type iron precipitate (produced in the manner described herein) was dissolved in aqueous sulphuric acid under various conditions. Examples 22 to 25 in Table 7 summarise the test results.

TABLE 7

|  | EXAMPLE | | | |
|---|---|---|---|---|
|  | 22 | 23 | 24 | 25 |
| Precipitate Mass (g/l) | 1,0 | 10,0 | 1,0 | 1,0 |
| Stirrer speed (rpm) | 500,0 | 500,0 | 500,0 | 500,0 |
| $(H_2SO_4)°$ (g/l) | 50,0 | 50,0 | 50,0 | 100,0 |
| Temperature (°C.) | 90,0 | 90,0 | 65,0 | 90,0 |
| Time | Fe | Fe | Fe | Fe |
| (minutes) | (ppm) | (ppm) | (ppm) | (ppm) |
| 0 | 0 | 0 | 0 | 0 |
| 5 | 37,0 | 334,0 | 11,0 | 103,0 |
| 10 | 59,0 | 601,0 | 16,0 | 127,0 |
| 15 | 89,0 | 990,0 | 21,0 | 170,0 |
| 30 | 183,0 | 1 770 0 | 33,0 | 260,0 |
| 60 | 269,0 | 2 500,0 | 60,0 | 355,0 |
| 120 | 351,0 | 3 300,0 | 109,0 | 394,0 |
| 180 | 384,0 | 3 350,0 | 166,0 | 384,0 |
| 240 | 388,0 | 3 400,0 | 207,0 | 396,0 |
| 300 | 388,0 | 3 600,0 | 230,0 | 393,0 |

Example results for tests conducted under case (v) (i.e. dissolution of goethite-type iron precipitate in aqueous sulphuric acid).

It is to be observed that the dissolution rate:

(a) is approximately proportional to the mass of precipitate present (compare "examples 22 and 23").

(b) decreases significantly with decreasing temperature (compare "examples 22 and 24").

(c) increases significantly with increasing sulphuric acid concentration (compare "examples 22 and 25").

The above experimental results were carried out to demonstrate the fundamental principles underlying the present invention. Several examples are now presented in which the leaching steps 2 and 4 indicated in FIGS. 1 to 3 are tested under more realistic conditions.

EXAMPLE 26

1 316.0 g of concentrate A containing 10.0% moisture was added to 5.0l leach solution. The leach solution was at 90.0° C. and initially contained 96.4 g/l Zinc, 55.6 g/l $Fe^{2+}$, 9.6 g/l $H_2SO_4$ and about zero ferric ions.

TABLE 8

Rate data for Example 26.

| Concentrate Type (−) | A |
| Mass of concentrate (g/l) | 236,9 |
| Temperature (°C.) | 90,0 |

| Time (mins) | $PO_2$ (kPa) | $Fe^{3+}$ (g/l) | $Fe^{2+}$ (g/l) | $H_2SO_4$ (g/l) | $Zn^{2+}$ (g/l) |
|---|---|---|---|---|---|
| 0 | 50,0 | 0 | 55,6 | 9,4 | 96,4 |
| 5,0 | 50,0 | 0,1 | 51,4 | 2,4 | — |

TABLE 8-continued

Rate data for Example 26.

| | | | | | |
|---|---|---|---|---|---|
| 10.0 | 100.0 | 0.2 | 47.4 | 3.6 | 105.02 |
| 15.0 | 150.0 | 0.6 | 43.6 | 3.6 | 109.0 |
| 30.0 | 200.0 | 3.6 | 33.6 | 2.6 | 119.0 |
| 60.0 | 200.0 | 1.2 | 28.0 | 3.6 | 126.6 |
| 120.0 | 200.0 | 1.2 | 25.2 | 3.4 | 131.6 |
| 180.0 | 200.0 | 1.2 | 15.8 | 3.0 | 138.9 |
| 240.0 | 200.00 | 0.8 | 10.6 | 2.4 | 142.7 |
| 300.0 | 200.00 | 0.4 | 2.6 | — | 147.7 |

This experiment simulates step 2 indicated in FIGS. 1, 2 and 3 and was performed to test the effect of progressively increasing the oxygen partial pressure to a value of only 200.0 kPa as the ferrous ion concentration decreases. Table 8 summarises the experimental data. It is observed that in 5.0 hours the iron concentration decreased from 55.0 g/l to 2.6 g/l and the zinc concentration increased from 96.4 g/l to 147.7 g/l. It is apparent that the rates would have been faster at a higher oxygen partial pressure. It is also obvious that the experiment could have been terminated after any desired time period to permit any desired iron concentration to remain in solution.

EXAMPLE 27

The leach solids from Example 26 were subjected to a flotation step to separate the unleached sulphide mineral particles and elemental sulphur from the goethite-type iron precipitate. Table 9 summarises the compositions of these fractions. 430.0 g of the dry goethite solids were added to 5.0 l of simulated return electrolyte having the following composition: 180.0 g/l $H_2SO_4$; 48.0 g/l Zn and zero ferrous and ferric iron concentrations.

TABLE 9

Summary of composition of solid fractions referred to in Example 27.

| | COMPOSITION % | | | | | |
|---|---|---|---|---|---|---|
| | Zn | Fe | Pb | Mn | Elemental Sulphur | $SO_4^=$ |
| Sulphide residue plus elemental sulphur | 41.4 | 9.7 | 0.06 | 2.16 | 18.7 | — |
| Goethite iron precipitate | 2.7 | 45.8 | 0.83 | 0.16 | 0.30 | 14.1 |

TABLE 10

| Time (mins) | Note (—) | $PO_2$ (kPa) | $(Fe^{3+})$ (g/l) | $(Fe^{2+})$ (g/l) | $(H_2SO_4)$ (g/l) | $(Zn^{2+})$ (g/l) |
|---|---|---|---|---|---|---|
| 0 | 1 | 0 | 0 | 0 | 180.0 | 48.0 |
| 5 | | | 27.0 | 2.6 | 122.0 | 48.0 |
| 10 | | | 28.0 | 2.6 | 97.0 | 48.2 |
| 15 | | | 28.0 | 2.6 | 98.0 | 48.0 |
| 30 | | | 28.0 | 2.6 | 98.0 | 48.2 |
| 60 | | | 29.0 | 2.6 | 97.0 | 48.2 |
| 160 | 2 | 0 | 29.0 | 2.6 | 90.0 | 48.5 |
| 165 | | | 25.0 | 13.8 | 90.0 | 52.0 |
| 170 | | | 23.0 | 14.4 | 90.0 | 53.6 |
| 175 | | | 20.0 | 16.8 | 90.0 | — |
| 190 | | | 14.0 | 22.0 | 90.0 | 55.8 |
| 220 | 3 | 500.0 | 10.0 | 26.4 | 90.0 | 59.0 |
| 250 | | | 25.0 | 15.6 | 82.0 | 62.4 |
| 280 | | | 22.0 | 13.6 | 67.0 | 65.3 |
| 340 | | | 29.2 | 10.2 | 59.6 | 70.0 |
| 400 | | | 32.0 | 8.8 | 55.0 | — |

Note 1. 430.0 g dry goethite precipitate with assay indicated in table 9 added at this point.
Note 2. 483.0 g dry residue consisting of unleached sulphides and elemental sulphur with assay indicated in table 9 added at this point. Note 3. Oxygen introduced at this point.

The solution temperature was 90.0° C. The goethite iron precipitate was added by itself to the leach solution merely to demonstrate that such iron dissolved rapidly. An inert $N_2$ atmosphere was maintained. After 160.0 minutes, 483.0 dry residue containing the unleached sulphides and elemental sulphur was added to the leach solution again with an inert $N_2$ atmosphere present to demonstrate that dissolution of the zinc sulphide proceeds and ferric ions are reduced to their ferrous state. After a further 60.0 minutes, oxygen at a partial pressure of 500.0 kPa was introduced to demonstrate that the reoxidation of the ferrous ions to their ferric state results in a decrease in the acid concentration. Insufficient zinc sulphide was present in this example to maintain the dissolved iron species in their ferrous state and hence permit rapid reduction of the acid concentration to a desired low level of about 10.0 g/l. These results are shown in Table 10.

It is apparent that by selecting the amount of goethite-type iron precipitate to be added to step 4 that any desired dissolved iron concentration may be achieved. Furthermore, provided sufficient zinc sulphide is present, a leach solution containing the desired concentrations of ferrous or ferric ions, sulphuric acid and zinc may be produced for recycle to the first leaching step 2. It is further apparent that if the goethite iron precipitate leach residue containing zinc sulphide and elemental sulphide and oxygen are added together, that the reactions typified by Equations (1), (2) and (3) will take place simultaneously at rates which are dependent on the oxygen partial pressure, temperature dissolved iron concentration and amount of zinc sulphide present. The final percentage extraction of zinc from the concentrate entering the process which can be achieved in a single pass through the leaching steps 2 and 4 will depend inter-alia on: whether stoichiometric sufficient $SO_4^{2-}$ is present to solubilise all the zinc; the grind of the concentrate; the leaching times, temperatures, oxygen partial pressures and other conditions selected for steps 2 and 4.

EXAMPLE 28

1 093.6 g Concentrate A containing about 10.0% moisture was added to 5.0 l leach solution at 90.0° C. which initially contained 102.9 g/l Zn; 17.9 g/l $Fe^{2+}$; 10.0 g/l $H_2SO_4$ and about zero ferric ions. The reaction was allowed to proceed for three hours with a 500.0 kPa oxygen overpressure. After three hours the leach solution contained 118.4 g/l Zn and about 1.2 g/l $Fe^{2+}$. The leach solids were flocculated, filtered and dried to give 1 119.5 g of goethite iron precipitate, unleached sulphides and elemental sulphur assaying 33.83% Zn; 14.76% Fe and 7.14% elemental sulphur.

The 1 119.5 g leach solids referred to above were then added to 5.0 l simulated return electrolyte containing 47.3 g/l Zn; 180.0 g/l $H_2SO_4$ and zero dissolved iron. The leach reaction was permitted to proceed for 5.0 hours at 90.0° C. with a 500.0 kPa oxygen overpressure. At the end of the 5.0 hours, the leach solution assayed 106.93 g/l Zn and 28.5 g/l dissolved iron. The final leach solids which were flocculated, filtered and dried, weighed approximately 414.6 g (dry) and assayed approximately 19.9% Zn; 4.0% Fe and 54.7% elemental sulphur. The overall percentage of zinc leached in steps 2 and 4 in this example was about 80% and is believed to be far from the results which will be achieved after further work has been carried out on the process variables.

What I claim as new and desire to secure by Letters Patent is:

1. A process for the treatment of zinc sulphide containing materials comprising the steps of:
   (i) contacting at a temperature of from 70° C. to 119° C., a sub-divided zinc sulphide material with an aqueous leach solution which has dissolved therein zinc and impurities, from 5 to 50 g/l iron, together with a maximum of 20 g/l sulphuric acid to dissolve zinc and other soluble metals in the zinc sulphide containing material by the oxidative action of ferric ions formed by the co-temporaneous oxidation of ferrous ions to their ferric state and cause precipitation of iron;
   (ii) separating the solids and leach liquor resulting from step (i);
   (iii) subjecting the leach liquor obtained in step (ii) to any required purification steps followed by electrowinning of zinc therefrom to leave a spent electrolyte having regenerated sulphuric acid therein;
   (iv) contacting spent electrolyte resulting from step (iii) above with the solids resulting from step (ii) above to cause redissolution of iron precipitate and the further dissolution of zinc and metal impurities from the residue of the zinc sulphide containing material by the oxidative action of ferric ions resulting from the dissolution of the iron precipitate and also formed by the co-temporaneous oxidation of ferrous ions to their ferric state;
   (v) separating the solids and leach solution resulting from step (iv), and;
   (vi) utilising the leach solution resulting from step (v) as at least the major portion of the aqueous leach solution employed in step (i).

2. A process as claimed in claim 1 in which the conditions in step (i) are controlled such that iron is precipitated predominantly in the form of a goethite-type precipitate.

3. A process as claimed in claim 1 in which iron is present in the zinc sulphide containing material and iron is removed by adjusting conditions in step (i) to leave sufficient residual iron in solution to be removed during purification of the leach liquor prior to electrowinning of zinc therefrom in step (iii).

4. A process as claimed in claim 1 in which iron is present in the zinc sulphide containing material and iron is removed from the system by subjecting a bleed stream of the solids/liquid resulting from step (i) to an iron removal step.

5. A process as claimed in claim 1 in which step (iv) is terminated at a sulphuric acid concentration which exists immediately prior to the commencement of the precipitation of iron.

6. A process as claimed in claim 1 in which step (iv) is continued until the iron has precipitated to an extent at which the total iron removed from the system in this and any purification step under step (iii) approximately equals the iron introduced into the system in the zinc sulphide containing material.

7. A process as claimed in claim 6 in which iron precipitated in step (iv) is separated from the residue of the zinc sulphide containing material to enable the latter to be recycled.

8. A process as claimed in claim 1 in which the zinc sulphide containing material is a finely ground zinc sulphide containing mineral.

9. A process as claimed in claim 1 in which the zinc sulphide containing material includes manganese which recycles through the process defined and which is removed during step (iii) to an extent such that build-up thereof, above a predetermined level, is prevented.

10. A process as claimed in claim 1 in which the spent electrolyte is a substantially conventional spent electrolyte containing from 40 to 60 g/l zinc and from 120 to 180 g/l sulphuric acid.

11. A process as claimed in claim 10 in which the leach solution fed to step (i) contains, in addition to the iron present therein, from 90 to 130 g/l zinc and 5 to 15 g/l sulphuric acid and wherein the leach liquor emanating from step (i) contains from 1 to 20 g/l iron, less than 10 g/l sulphuric acid and from 130 to 160 g/l zinc.

12. A process as claimed in claim 1 in which steps (i) and (iv) are carried out at a temperature of between 85° C. and 100° C.

13. A process as claimed in claim 1 in which steps (i) and (iv) are carried out at an oxygen partial pressure between that with air at atmospheric pressure and about 500 kilopascals.

* * * * *